(12) United States Patent
Wong

(10) Patent No.: US 7,621,213 B2
(45) Date of Patent: Nov. 24, 2009

(54) SALAD SPINNER

(75) Inventor: Sui Wah Wong, Hong Kong (HK)

(73) Assignee: King's Flair Development Ltd., Hong Kong (HK)

( * ) Notice: Subject to any disclaimer, the term of this patent is extended or adjusted under 35 U.S.C. 154(b) by 1 day.

(21) Appl. No.: 11/741,820

(22) Filed: Apr. 30, 2007

(65) Prior Publication Data

US 2007/0256315 A1     Nov. 8, 2007

Related U.S. Application Data

(60) Provisional application No. 60/796,552, filed on May 2, 2006.

(51) Int. Cl.
*A47J 37/10*    (2006.01)
(52) U.S. Cl. .................. 99/495; 99/511; 34/58
(58) Field of Classification Search ............ 99/495, 99/516, 510–513, 536; 34/58, 184; 494/60, 494/84; 210/360.1, 380.1; 241/37.5, 92
See application file for complete search history.

(56) References Cited

U.S. PATENT DOCUMENTS 3,885,321 A * 5/1975 Fouineteau ............... 34/58
4,144,286 A * 3/1979 Casper et al. ............ 525/84
5,054,209 A * 10/1991 Koff ........................... 34/58
5,490,453 A * 2/1996 Mackay .................... 99/495
5,865,109 A    2/1999 Bull
6,298,775 B1 * 10/2001 Chen ......................... 99/422
6,473,988 B1   11/2002 Mulhauser et al.
6,510,785 B1 * 1/2003 Margolin .................. 99/495
6,622,618 B1 * 9/2003 Glucksman et al. ...... 99/495
7,111,546 B2 * 9/2006 Siegel et al. .............. 99/495
2006/0037211 A1 2/2006 Herren

* cited by examiner

*Primary Examiner*—Timothy F. Simone
(74) *Attorney, Agent, or Firm*—Rabin & Berdo, P.C.

(57)     ABSTRACT

A salad spinner is disclosed, comprising an outer bowl; an inner basket receivable in the outer bowl; a lid placed over the outer bowl; a drive and brake mechanism combination comprising a rotary drive plate, a drive assembly engageable with the rotary drive plate, and a brake assembly; and a foldable handle operatively connected with the drive and brake mechanism combination, wherein the handle is allowed to be folded up to a locked position where the brake assembly interferes with the rotary drive plate to prevent spinning operation of the inner basket, and to be opened to an unlocked position where the brake assembly disengages from the rotary drive plate and manipulation of the handle in a horizontal direction enables the drive assembly to cause rotation of the driving rotation of the rotary drive plate and the inner basket.

12 Claims, 10 Drawing Sheets

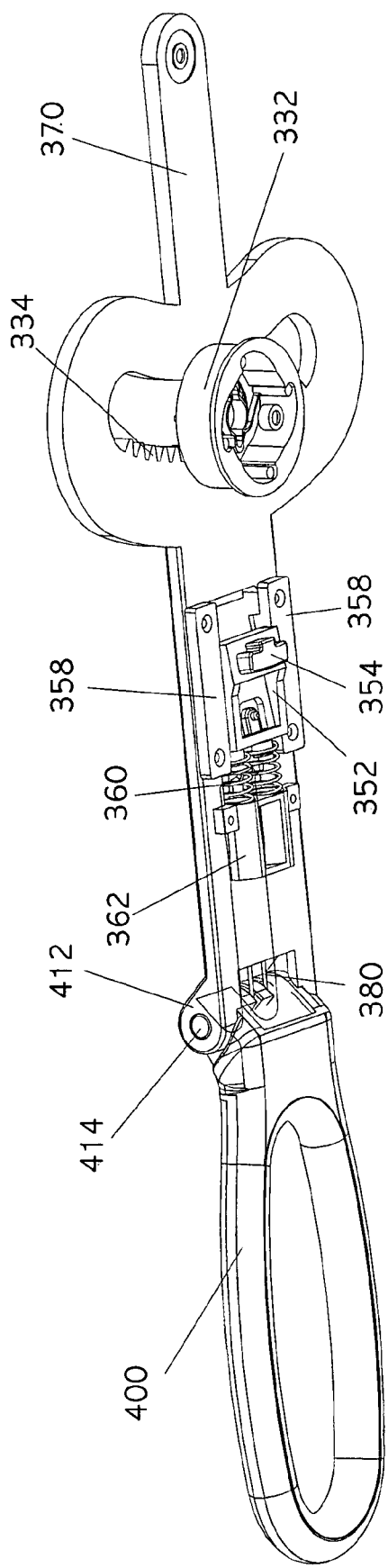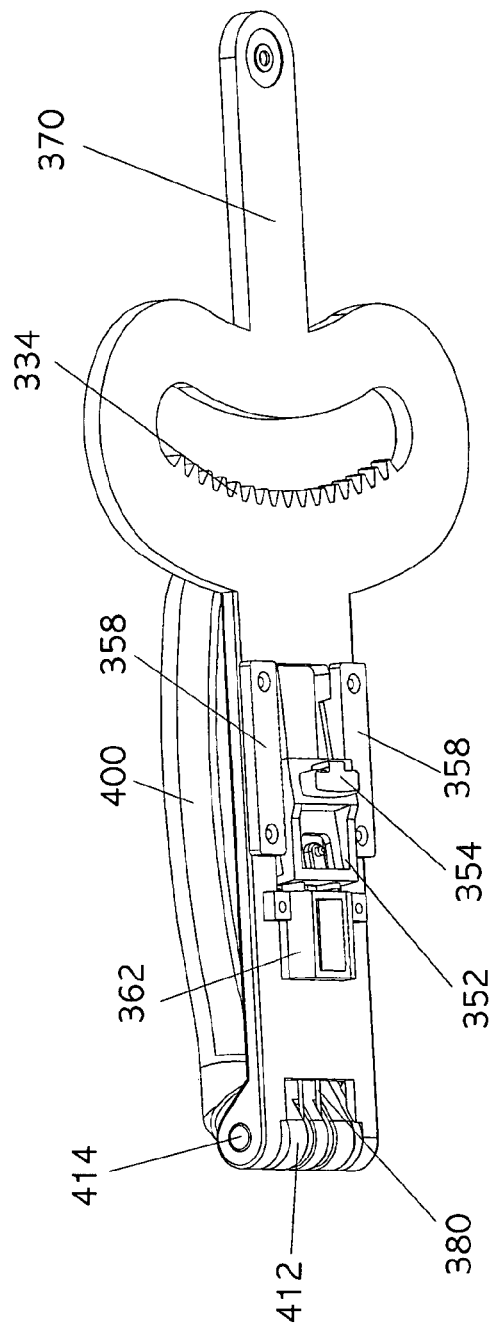
Fig. 8
Fig. 9

Section C

Section C

SALAD SPINNER

RELATED APPLICATION

This non-provisional application claims priority from provisional application No. 60/796,552, filed on May 2, 2006, the disclosure of which is incorporated herein by reference in their entirety.

FIELD OF THE INVENTION

This invention relates generally to food appliances and, more particularly, to a salad spinner with integration of a drive assembly for rotating basket and a brake system for stopping basket rotation.

BACKGROUND OF THE INVENTION

While a variety of salad spinners are known in the art, for example, in U.S. Patent Application No. 2006/0037211A1, U.S. Pat. Nos. 6,473,988 and 5,865,109, none are available which provide the user with the ease and simplicity of manipulation of the salad spinner, such as is the subject of the present invention.

Salad spinners in the prior art typically consist of an outer bowl, an inner perforated basket adapted to nest within the outer bowl, a drive assembly for rotating the basket to attain water removal by centrifuge action. Some of them are further fitted with a brake assembly which is, however, of complicated construction.

U.S. Patent Application No. 2006/0037211A1 discloses a drive mechanism having a rotary drive plate with a cord drum and a pull cord, rotational movement of the drive mechanism by a pull grip enables the spin-drier basket to rotate. However, a separate brake mechanism is required to stop the rotation of the spin-drier basket in this patent.

U.S. Pat. No. 6,473,988 illustrates a drive assembly which includes a conversion mechanism for transmitting axially reciprocating movement of a plunger to rotational movement of a lid relative to a cover. The cover carries a radial movable latch engageable with the drive assembly for latching the plunger in a downward or retracted position. In this patent, a manually depressible brake is provided for frictional engagement with the lid to brake rotation of the lid. This brake is however not easy to operate and requires a substantial amount of effort to stop spinning operation.

The salad spinners disclosed in the above two patents are operated atop the lid of the salad spinners. While U.S. Pat. No. 5,865,109 discloses a drive mechanism for salad spinner, comprising a drive gear associated with a handle laterally mounted on the lid and a pinion gear which meshes with the drive gear whereby lateral movement of the handle allows for spinning of the inner basket. Similarly, there is no brake system in this patent, application of force on the drive mechanism is required to rapidly stop the spinning operation or the inner basket is allowed to slowly come to a halt.

These salad spinners fulfill their respective, particular objectives and requirements, but these spinners and the known products on the market require either application of force on the drive assembly or a separate brake system to stop spinning operation. Therefore, there exists a need for a salad spinner which is easy to spin and convenient to stop the spinning.

SUMMARY OF THE INVENTION

The present invention has been developed to fulfill the need noted above and therefore has a principle object of the provision of a salad spinner a drive and brake mechanism combination to provide the convenience of rotating and stopping the salad spinner.

Another object of the invention is to provide a salad spinner which is low force activated, ergonomically improved and takes up less space.

These and other objects and advantages of the invention are satisfied by providing a salad spinner comprising:

an outer bowl having an open top and a closed bottom with a central pivot;

an inner basket having a bottom portion carrying a central bearing recess engageable with the central pivot upon insertion into the outer bowl and provided with a plurality of spaced circumferential ribs;

a lid placed over the outer bowl;

a drive and brake mechanism combination comprising a rotary drive plate rotatably engageable with the inner basket and having a raised ring portion at its one side, a plurality of spaced circumferential tabs which mesh with the ribs of the inner basket, and a central hub member; a drive assembly engageable with the central hub member of the rotary drive plate for rotating the rotary drive plate which in turn rotates the inner basket by meshing engagement of the tabs with the ribs; and a brake assembly including a movable brake pad capable of engaging with the raised ring portion of the rotary drive plate; and a foldable handle operatively connected with the drive and brake mechanism combination, wherein the handle is allowed to be folded up to a locked position where the brake pad of the brake assembly interferes with the raised ring portion of the rotary drive plate to prevent spinning operation of the inner basket, and to be opened to a unlocked position where the brake pad of the brake assembly disengages from the raised ring portion of the rotary drive plate and manipulation of the handle in a horizontal plane enables the drive assembly to cause rotation of the rotary drive plate and the inner basket.

The lid may define a slot in which the foldable handle moves back and forth. The lid may further define an undercut portion in which the handle is recessed and flush with the lid in a stored status in order to provide a flat stacking surface and reduce the overall storage space of the salad spinner.

In a preferred embodiment of the invention, the drive and brake mechanism combination further comprises a turning arm on which the drive assembly and the brake assembly are supported and carried respectively, said turning arm being operatively connected with the handle. The drive assembly comprises a drive gear engageable with the hub member of the rotary drive plate, and a gear rack arranged on the turning arm and engageable with the drive gear, whereby movement of the handle enables rotation of the drive gear which drives the rotary drive plate to cause rotation of the inner basket relative to the outer bowl.

The brake assembly further comprises a moving plate on which the brake pad is arranged and a spring means connected to the moving plate for assisting in opening the handle. The spring means may be comprised of two springs disposed within their respective spring holders. One or more cords may be provided to link the handle and the moving plate for actuating movement of the moving plate along with the handle.

In one preferred embodiment, the handler of the salad spinner is folded up by 90 degrees to reach the locked position and by further 90 degrees to reach a full-stop and stored position. In another embodiment, the handler is folded up by 180 degrees to reach the locked and stored position.

To have a better understanding of the invention reference is made to the following detailed description of the invention and embodiments thereof in conjunction with the accompanying drawings.

BRIEF DESCRIPTION OF THE DRAWINGS

FIG. 8 is a bottom perspective view of the drive and brake mechanism combination in the unfoldable state.

FIG. 9 is a bottom perspective view of the drive and brake mechanism combination in the foldable state.

In the various figures of the drawings, like reference numbers are used to designate like parts.

DETAILED DESCRIPTION OF THE PREFERRED EMBODIMENTS

Figure 1:
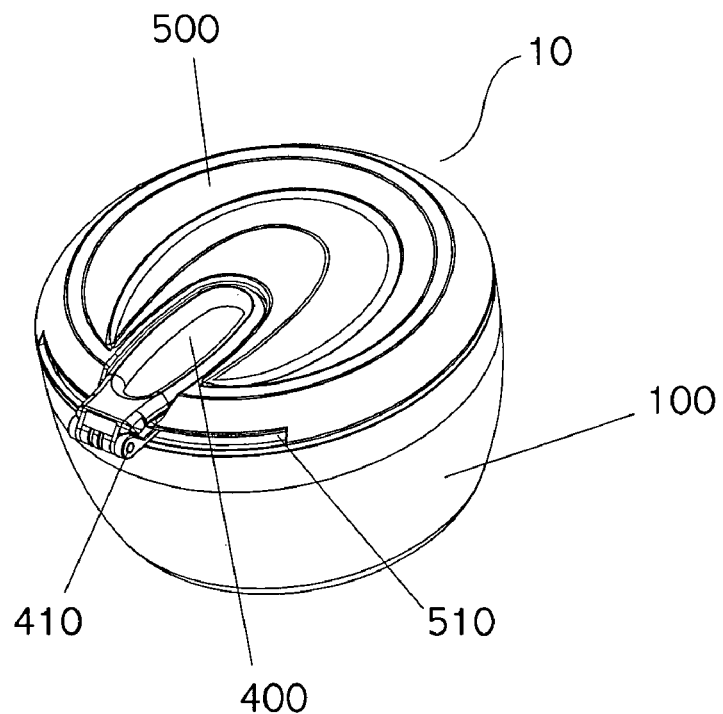
FIG. 1 is a perspective view of a salad spinner consistent with an embodiment of the invention in foldable state.
Figure 2:
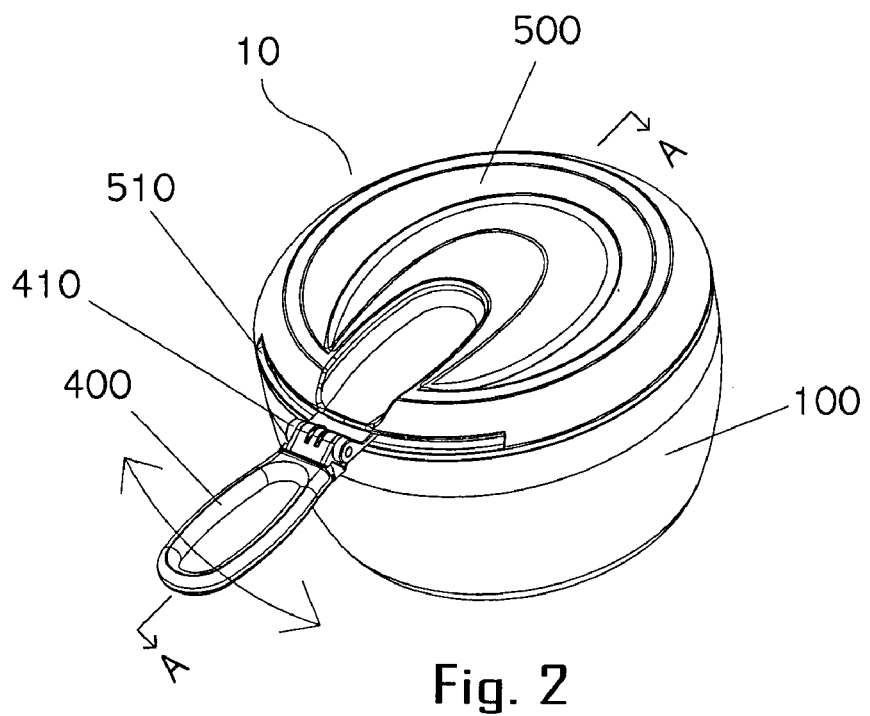
FIG. 2 is a perspective view of the salad spinner of FIG. 1 in unfoldable state.
Figure 3:
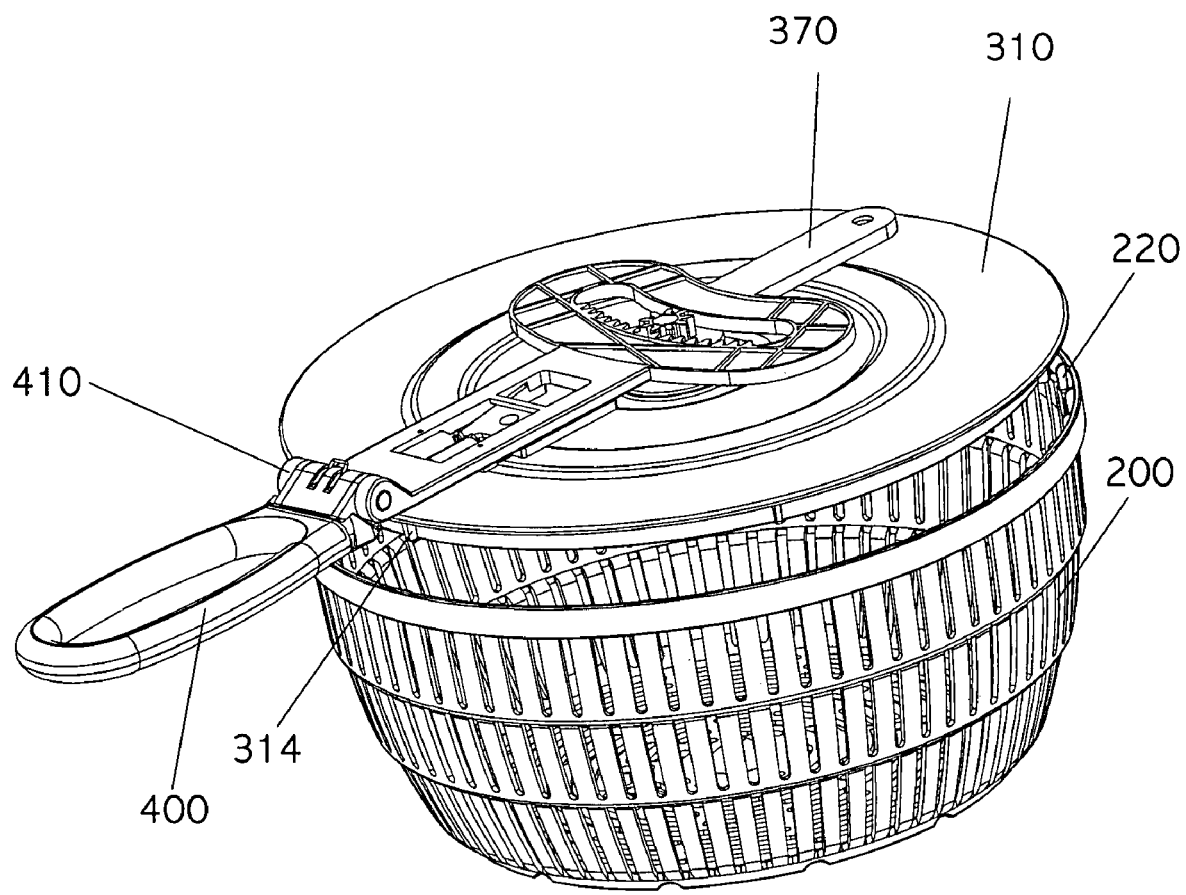
FIG. 3 is a perspective view of the salad spinner of FIG. 1 in the foldable state with a lid and an outer bowl being removed.

A salad spinner embodying the principles and concepts of the present invention and designated in its entirety by reference numeral 10 will be described with reference to the drawings and particularly to FIGS. 1-14 thereof. While this invention is illustrated and described in a preferred embodiment, the salad spinner may be produced in many different configurations, forms and materials.

Referring firstly to FIGS. 1-5 of the drawings, the salad spinner 10 comprises a transparent or opaque outer bowl 100 having an open top and a closed bottom and a perforated inner basket 200 disposed in the outer bowl 10. The outer bowl 100 has a solid wall construction and a central pivot 110 in its bottom that acts as a bowl pivot. The inner basket 200 has a bottom portion carrying a central bearing recess 210. When the inner basket 200 is inserted into the outer bowl 100, the bearing recess 210 mates with the pivot 110 so as to nest and spin the basket 200 within the bowl 100. It can be seen from FIG. 4 that the basket 200 are provided with a plurality of spaced circumferential ribs 220 at the inner surface of its top edge. These ribs 220 will be described in detail hereinafter.

Figure 4:
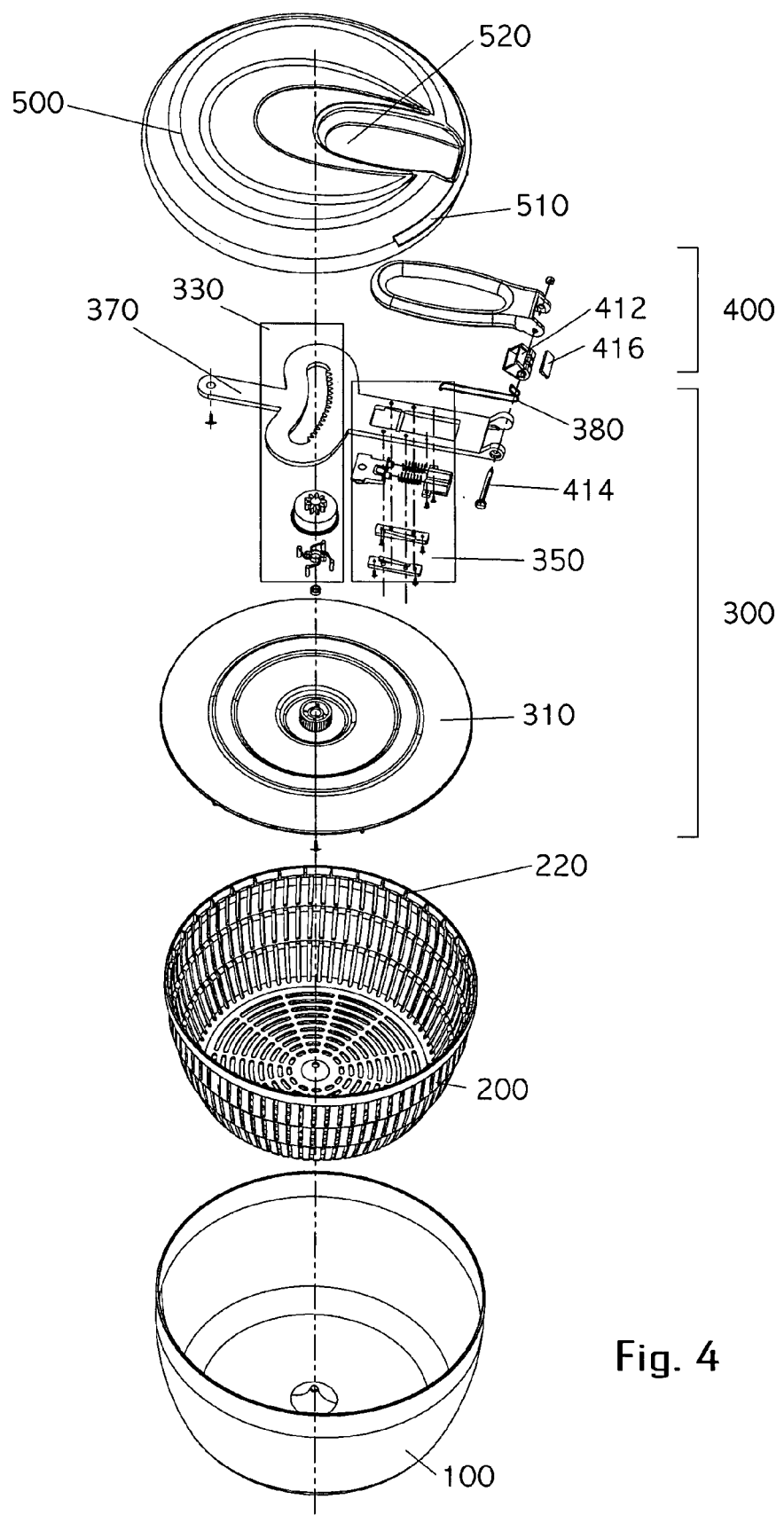
FIG. 4 is an exploded view of the salad spinner of FIG. 1.
Figure 5:
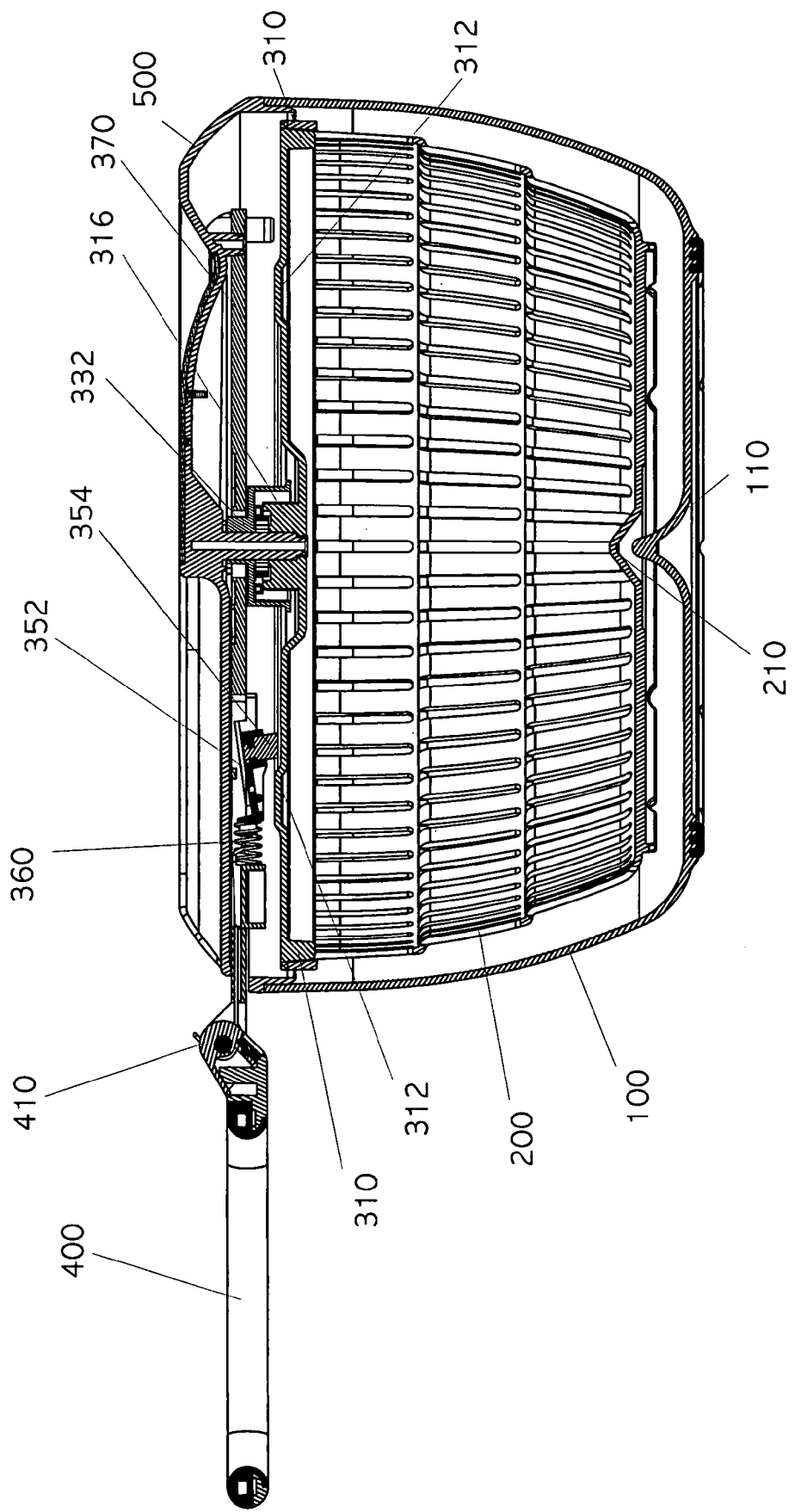
FIG. 5 is a cross-sectional view taken along line A-A of FIG. 2.

The salad spinner 1 also comprises a removable lid 500 which is placed over a top edge of the outer bowl 100. As best shown in FIG. 4, the lid 500 defines a slot 510 along a part of its perimeter and an undercut portion 520 on its top surface. The slot 510 and the undercut portion 520 are arranged at the same end of the lid 500. The lid 500 as well as the bowl 100 and the basket 200 may made of a plastic material.

Figure 6:
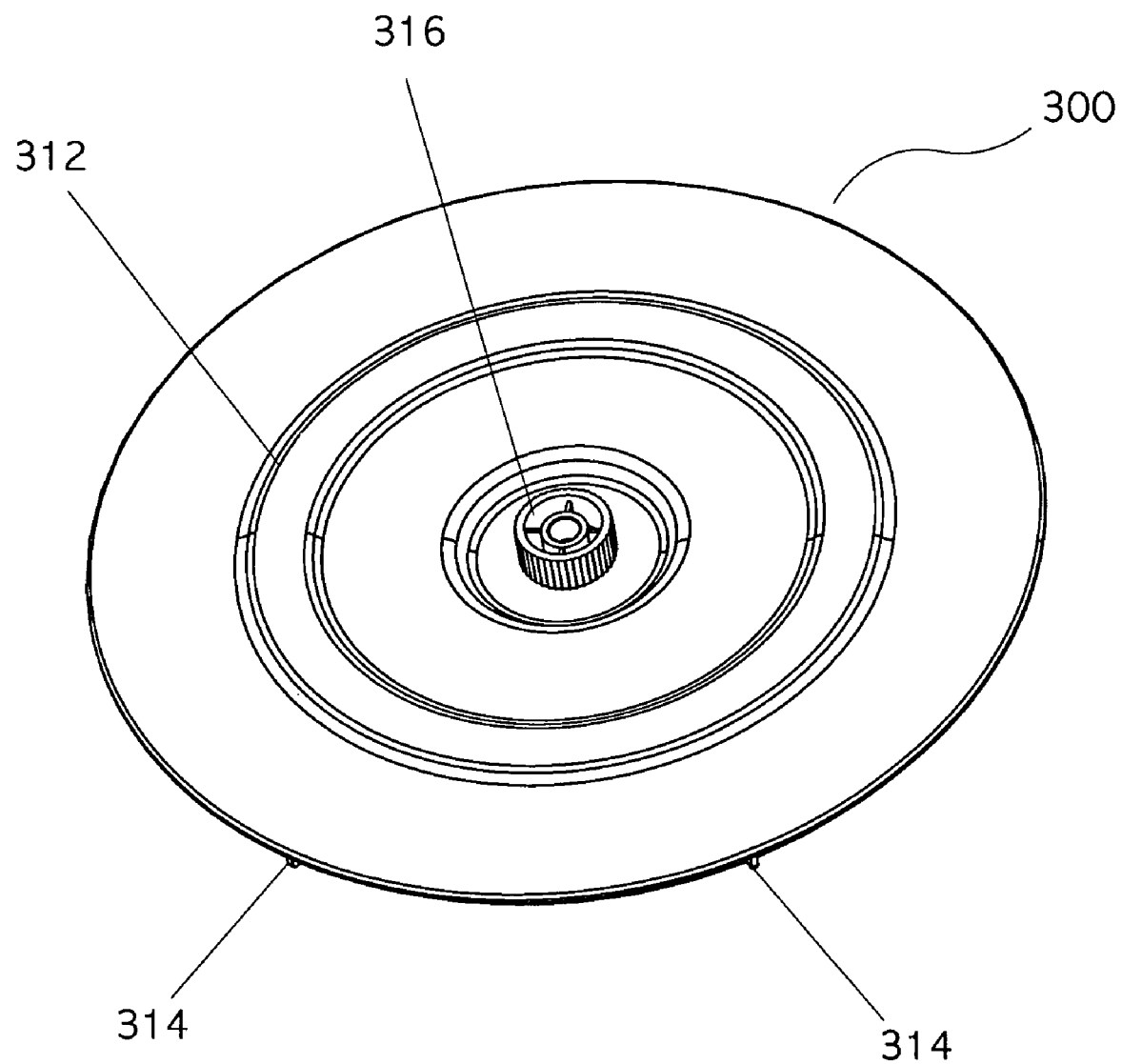
FIG. 6 is a perspective view of a rotary drive plate of the salad spinner of FIG. 1.

A drive and brake mechanism 300 combination employed by the salad spinner 10 comprises a rotary drive plate 310, a drive assembly 330 and a brake assembly 350. FIG. 6 illustrates a perspective view of the rotary drive plate 310 which has a raised ring portion 312 at its one side, a plurality of spaced circumferential tabs 314 directed towards the inner basket 200 and mating with the ribs 220, and a central hub member 316. The tabs 314 create a meshing engagement with the ribs 220 of the basket 200 for converting the rotatable movement of the rotary drive plate 310 to the spinning motion of the basket 200.

Figure 7:
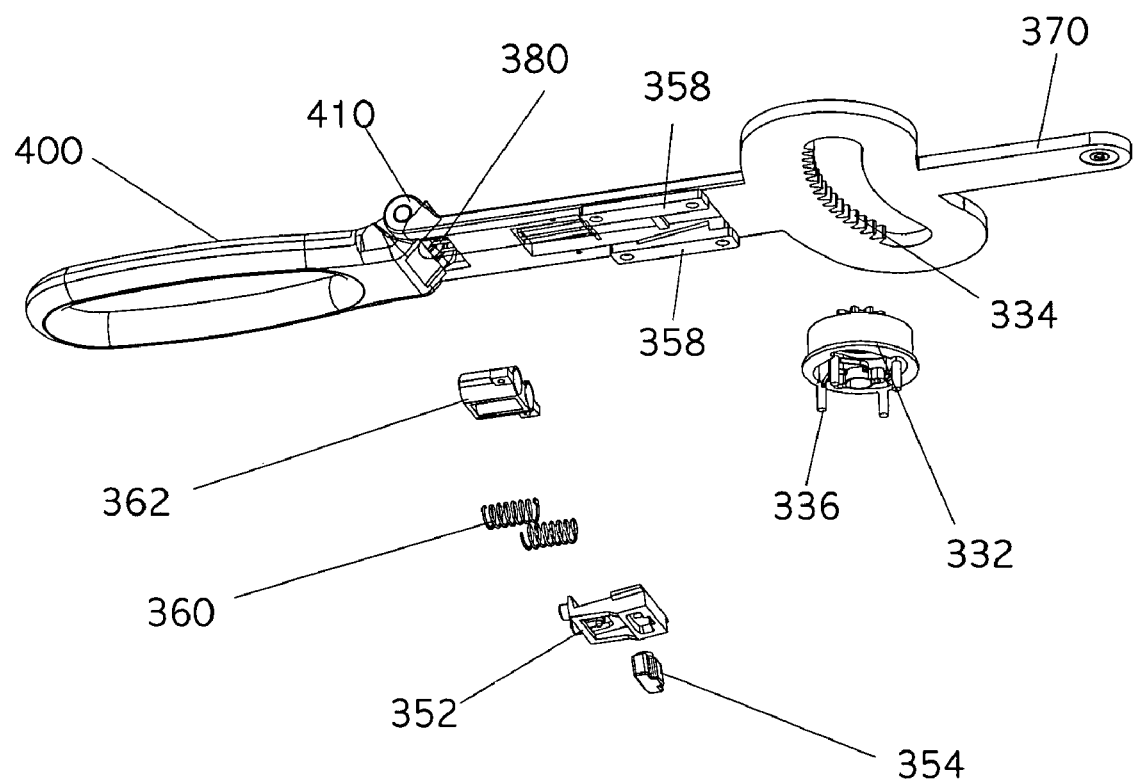
FIG. 7 is an exploded view of a drive and brake mechanism combination employed by the salad spinner of FIG. 1.

In FIGS. 7 to 9, the drive assembly 330 and the brake assembly 350 are shown in more detail. The two assemblies both are supported and carried on a turning arm 370. The turning arm 370 has one end secured on the lid 500 as a supporting point of the turning arm 370 and the other end extending outwardly from the slot 510 of the lid 500. The drive assembly 330 includes a drive gear 332 engageable with the hub member 316 of the rotary drive plate 310 by use of an actuator 336, and a variable depth gear rack 334 arranged on the turning arm and engageable with the drive gear 332. The gear rack 334 engages with the drive gear 332 that produces a proper torque to rotate the rotary drive plate 310 which in turn rotates the inner basket 200 relative to the outer bowl 100. In the salad spinner of this embodiment, the drive assembly 330 is quite similar in structure to the drive mechanism disclosed in U.S. Pat. No. 5,865,109, the disclosure of which is incorporated herein by reference. It would be appreciated that the drive assembly 330 may be of any design that is associated with the rotary drive plate 310 and the brake assembly 350.

The exposed end of the turning arm 370 is formed with a bore in which the brake assembly 350 is located. The brake assembly 350 includes a moving plate 352 having a brake pad 354 such as a rubber head at its one end, and a spring means 356 having one end attached to the moving plate 352. The moving plate 352 carrying the brake pad 354 is mounted movably left and right in the bore of the turning arm 370 by use of two location blocks 358. The brake pad 354 is capable of interfering with the raised ring portion 312 of the rotary drive plate 310 to stop the spinning of the inner basket 200. The spring means 356 is comprised of two springs 360 disposed within their respective spring holders 362. The springs 360 can store energy in the locked position.

The salad spinner 10 includes a handle 400 which has a hinge means 410 at its one end through which the handle 400 is pivotally connected with the exposed end of the turning arm 370. It is clear from FIG. 4 that the hinge means 410 includes a hinge support 412 with a through hole, a hinge axis 414 passing through the through hole, and a hinge cover 416 on the hinge support 412. The hinge means 410 allows the handle 400 for pivoting upon the turning arm 370, i.e. the handle 400 is allowed to be folded up and opened relative to the turning arm 370 pivotal upon the hinge means 410 and to move horizontally and integrally with the turning arm 370. One may move the handle 400 back and forth along with the turning arm 370 in a horizontal direction within the slot 510 in the unfoldable or unlocked position. Such movement of the handle 400 causes motion of the gear rack 334 which drives the drive gear 332 to rotate due to the pinion engagement as mentioned above, by which the rotary drive plate 350 is actuated to rotate.

A cord 380 such as a nylon rope is used to connect the handle 400 and the moving plate 352, such that the moving plate 352 carrying the brake pad 354 is actuated to move towards or away from the raised ring portion 312 of the rotary drive plate 310 by pivotal movement of the handle 400 in order to effect spinning or stop the spinning.

Figure 10:
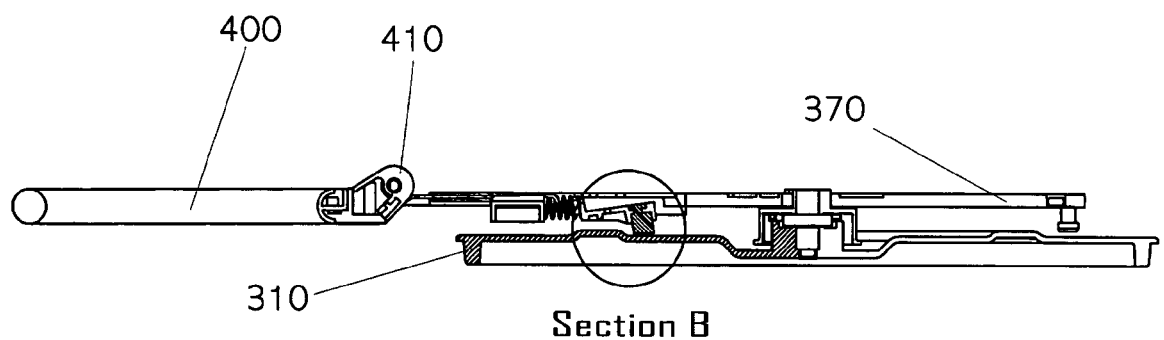
FIG. 10 is a partial cross-sectional view of the salad spinner of FIG. 1 in the unfoldable state showing that the brake assembly disengages from the rotary drive plate.
Figure 11:
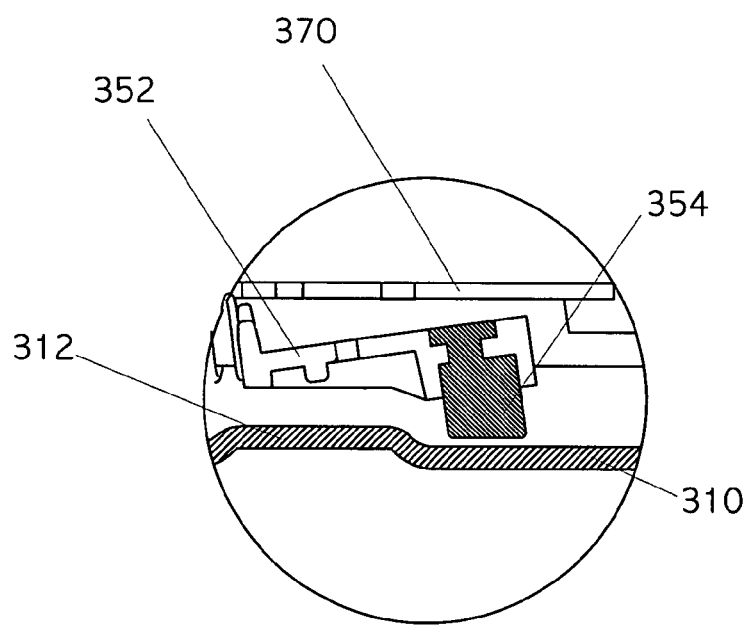
FIG. 11 is an enlarged view of section B of FIG. 10.
Figure 12:
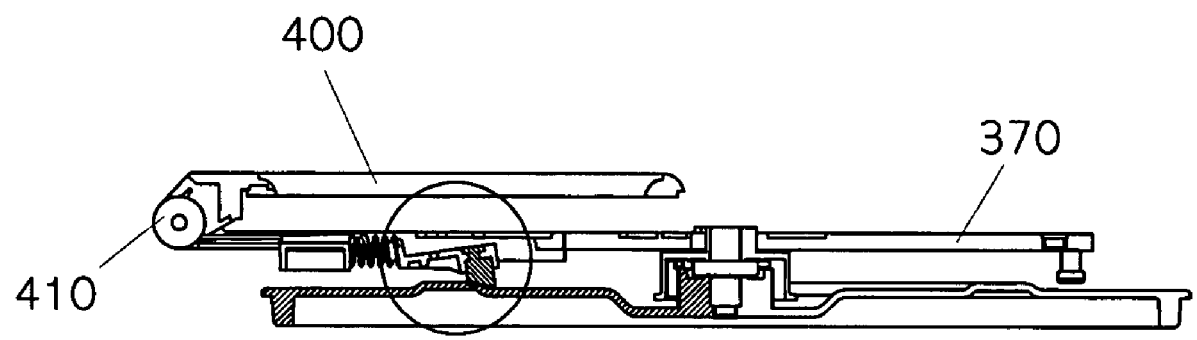
FIG. 12 is a partial cross-sectional view of the salad spinner of FIG. 1 in the foldable state showing that the brake assembly is interfering with the rotary drive plate.
Figure 13:
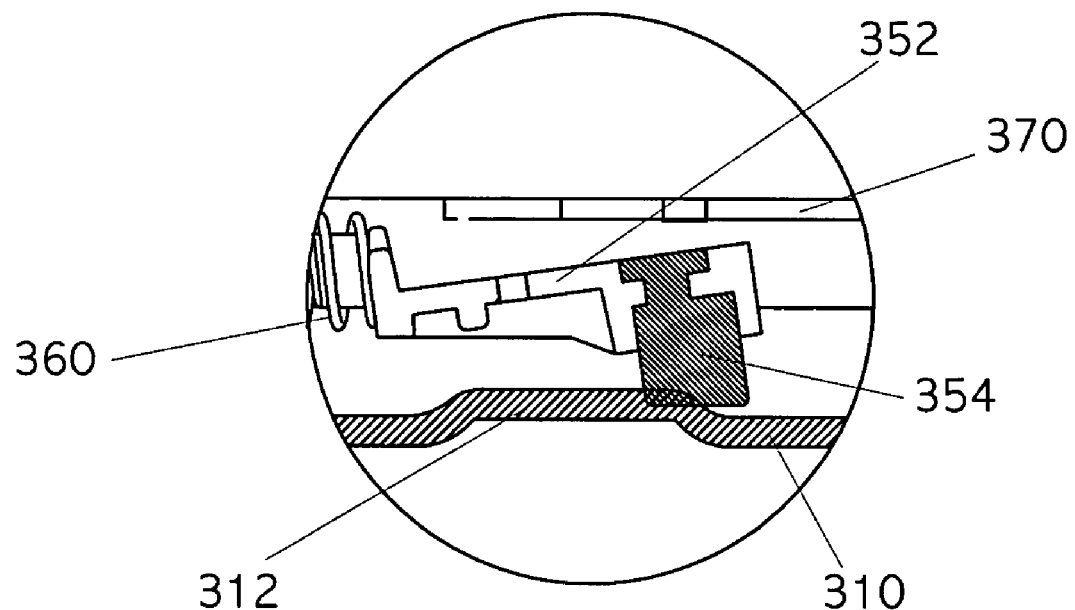
FIG. 13 is an enlarged view of section C of FIG. 12.

The hinge means 410 allows the handle 400 to be folded up by 90 degrees to the locked position where the brake pad 354 is interfering with the raised ring portion 312 of the rotary drive plate 310, so as thereby to stop the spinning. The handle 400 is further folded up by 90 degrees to reach a full stop position where the handle 400 is recessed in the undercut portion 520 of the lid 500 and flush with the top to provide a flat stacking surface, as clearly shown in FIGS. 9, 12 and 13. Referring to FIGS. 8, 10 and 11, when the handle 400 is raised, the cord 380 draws the moving plate 352 to move away from the raised ring portion 312 and the springs 360 also automatically push the moving plate 352 into the unlocked position where the brake pad 354 disengages from the raised ring portion 312, so as thereby to permit free spinning of the rotary drive plate 310 which in turn rotates the inner basket 200. That is, the brake assembly 350 can translate into the locked and unlocked positions with the pivoting of the handle 400.

Figure 14:
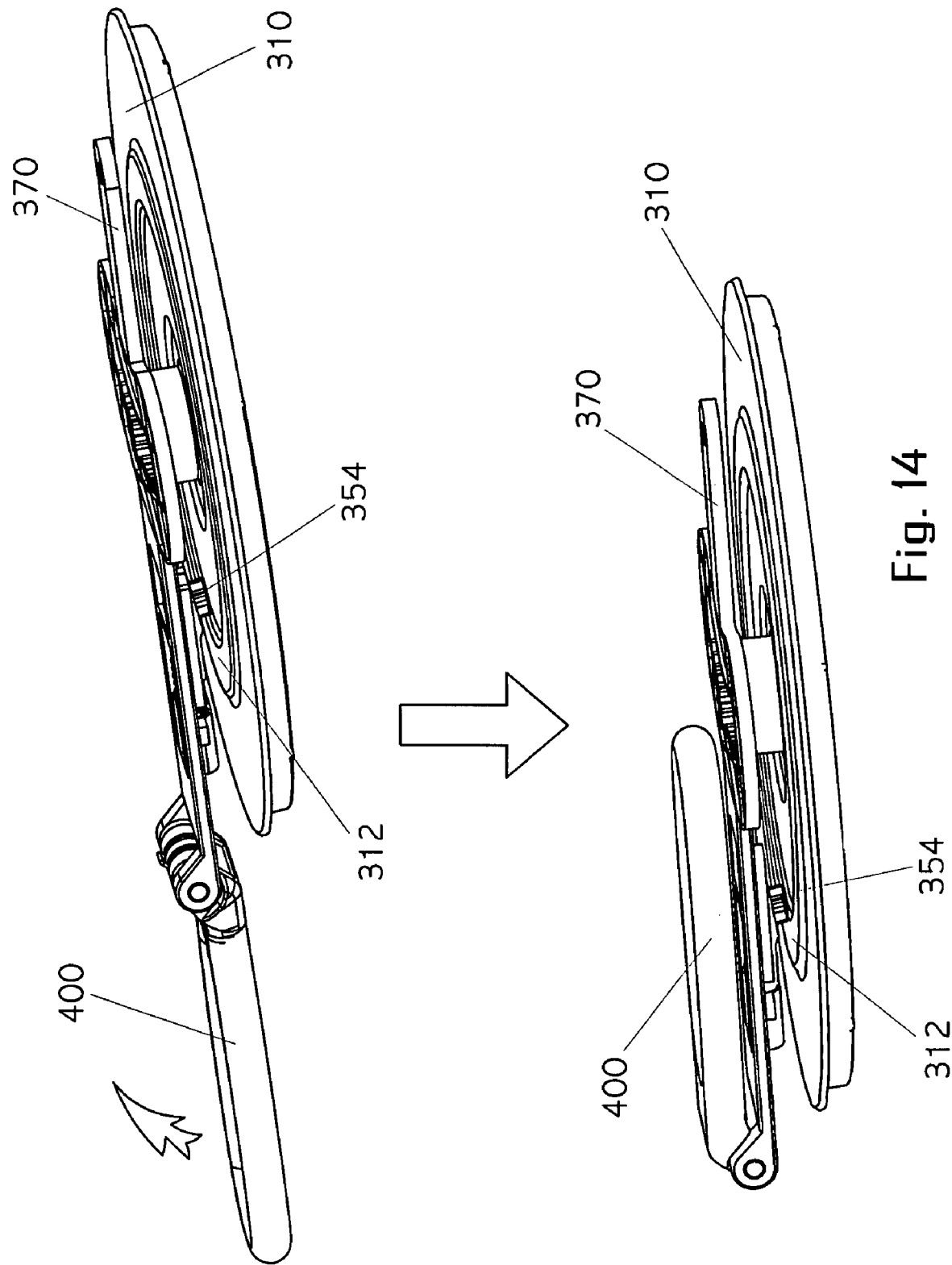
FIG. 14 is a perspective view of the drive and brake mechanism combination and the handle shown in the unfoldable and foldable states.

FIG. 14 illustrates the drive and brake mechanism combination and the handle shown in the locked and unlocked positions.

With collective reference to FIGS. 10 to 14, when it is desirable for spinning operation, the handle 400 is opened pivotal upon the hinge means 410 by 180 degrees, which causes the moving plate 352 to move away from the rotary drive plate 310 so that the brake pad 354 on the moving plate 352 does not rub against the raised ring portion 312 of the rotary drive plate 310. Consequently, no friction is applied to the rotary drive plate 310, as is apparent from FIG. 11. The spring force generated in the foldable state automatically provides the compression energy help for opening the handle 400. In the unfoldable state of the handle 400, moving the handle back and forth within the slot 510 in a horizontal plane causes the drive gear 332 to rotate by means of the pinion engagement with the gear rack 334, which subsequently drives the rotary drive plate 310 to rotate. With the meshing engagement of the ribs 220 of the inner basket 200 with the tabs 314 provided on the rotary drive plate 310, the rotation of the drive plate 310 effects the purpose that the inner basket 200 spins relative to the outer bowl 100. Continuous movement of the handle 400 in the horizontal plane leads to continuous spinning of the inner basket 200.

In order to stop the spinning of the inner basket 200, folding up the handle 400 causes the moving plate 352 to move towards the rotary drive plate 310 so that the brake pad 354 on the moving plate 352 rubs against the raised ring portion 312 of the drive plate 310. Consequently, friction between the brake pad 354 and the raised ring portion 312 is generated to stop rotating. In the foldable state of the handle 400, the salad spinner 10 is intended for storage with the handle 400 receivable in the undercut portion 520 and the springs 360 are compressed by the moving plate 352, which can store energy. With the handle 400 being recessed in the undercut portion 520 and flush with the lid 500, the salad spinner takes up less space and provides the convenience of storage.

As discussed above, a significant feature of the invention is the construction of the brake assembly 350 and the handle 400, which enables to easily and conveniently stop the spinning of the salad spinner where necessary. This was not accomplished by the prior art food appliances including salad spinners.

While the embodiment described herein is intended as an exemplary salad spinner for drying food articles, it will be appreciated by those skilled in the art that the present invention is not limited for drying food articles, and may be employed for drying other household items.

It is understood that many other embodiments of the present invention are also possible, and many corresponding modifications as well as variations can be made by those skills in the art as according to the disclosure of the present invention and without departing from the spirits and essentials thereof, while such modifications and variations fall into the scope of the claims of the present invention.

What is claimed is:

1. A salad spinner comprising:
   an outer bowl having an open top and a closed bottom with a central pivot;
   an inner basket having a bottom portion carrying a central bearing recess engageable with the central pivot upon insertion into the outer bowl and provided with a plurality of spaced circumferential ribs;
   a lid placed over the outer bowl;
   a drive and brake mechanism combination coupled to the lid, the drive and brake mechanism combination including
   a rotary drive plate having a raised ring portion at its one side, a plurality of spaced circumferential tabs which mesh with the ribs of the inner basket, and a central hub member, the rotary drive plate being rotatably engageable with the inner basket,
   a drive assembly engageable with the central hub member of the rotary drive plate for rotating the rotary drive plate which in turn rotates the inner basket by meshing engagement of the tabs with ribs, and
   a brake assembly including a movable brake pad capable of engaging with the raised ring portion of the rotary drive plate; and
   a foldable handle to control spinning of the inner basket by operating in a locked position and an unlocked position, and operatively connected with the drive and brake mechanism combination, the handle being folded into the locked position to move the brake pad of the brake assembly to interfere with the raised ring portion of the rotary drive plate to prevent spinning operation of the inner basket, the handle being unfolded into an unlocked position to move the brake pad of the brake assembly to disengage from the raised ring portion of the rotary drive plate, and manipulation of the handle in a horizontal plane enables the drive assembly to cause rotation of the rotary drive plate and the inner basket.

2. The salad spinner as claimed in claim 1, wherein the lid defines a slot in which the foldable handle moves back and forth.

3. The salad spinner as claimed in claim 1, wherein the lid further defines an undercut portion in which the handle is recessed and flush with the lid in a stored status.

4. The salad spinner as claimed in claim 1, wherein the drive and brake mechanism combination comprises a turning arm on which the drive assembly and the brake assembly are supported and carried respectively, said turning arm being operatively connected with the handle.

5. The salad spinner as claimed in claim 4, wherein the drive assembly comprises a drive gear engageable with the hub member of the rotary drive plate, and a gear rack arranged on the turning arm and engageable with the drive gear, whereby movement of the handle enables rotation of the drive gear which drives the rotary drive plate to cause rotation of the inner basket relative to the outer bowl.

6. The salad spinner as claimed in claim 1, wherein the brake assembly further comprises a moving plate on which the brake pad is arranged.

7. The salad spinner as claimed in claim 6, wherein the brake assembly furthers comprises a spring means connected to the moving plate for assisting in opening the handle.

8. The salad spinner as claimed in claim 7, wherein the spring means is comprised of two springs disposed within their respective spring holders.

9. The salad spinner as claimed in claim 6, wherein one or more cords are provided to link the handle and the moving plate for actuating movement of the moving plate along with the handle.

10. The salad spinner as claimed in claim 1, wherein the handler is folded up by 90 degrees to reach the locked position.

11. The salad spinner as claimed in claim 10, wherein the handle is folded up by further 90 degrees to reach a stored position.

12. The salad spinner as claimed in claim 1, wherein the handler is folded up by 180 degrees to reach the locked and stored position.

* * * * *

UNITED STATES PATENT AND TRADEMARK OFFICE
CERTIFICATE OF CORRECTION

| | | |
|---|---|---|
| PATENT NO. | : 7,621,213 B2 | Page 1 of 1 |
| APPLICATION NO. | : 11/741820 | |
| DATED | : November 24, 2009 | |
| INVENTOR(S) | : Siu Wah Wong | |

It is certified that error appears in the above-identified patent and that said Letters Patent is hereby corrected as shown below:

Title page Item (75), Change inventor's name from "Sui Wah Wong" to --Siu Wah Wong--

Signed and Sealed this

Sixteenth Day of February, 2010

David J. Kappos
*Director of the United States Patent and Trademark Office*